Patented Dec. 19, 1933

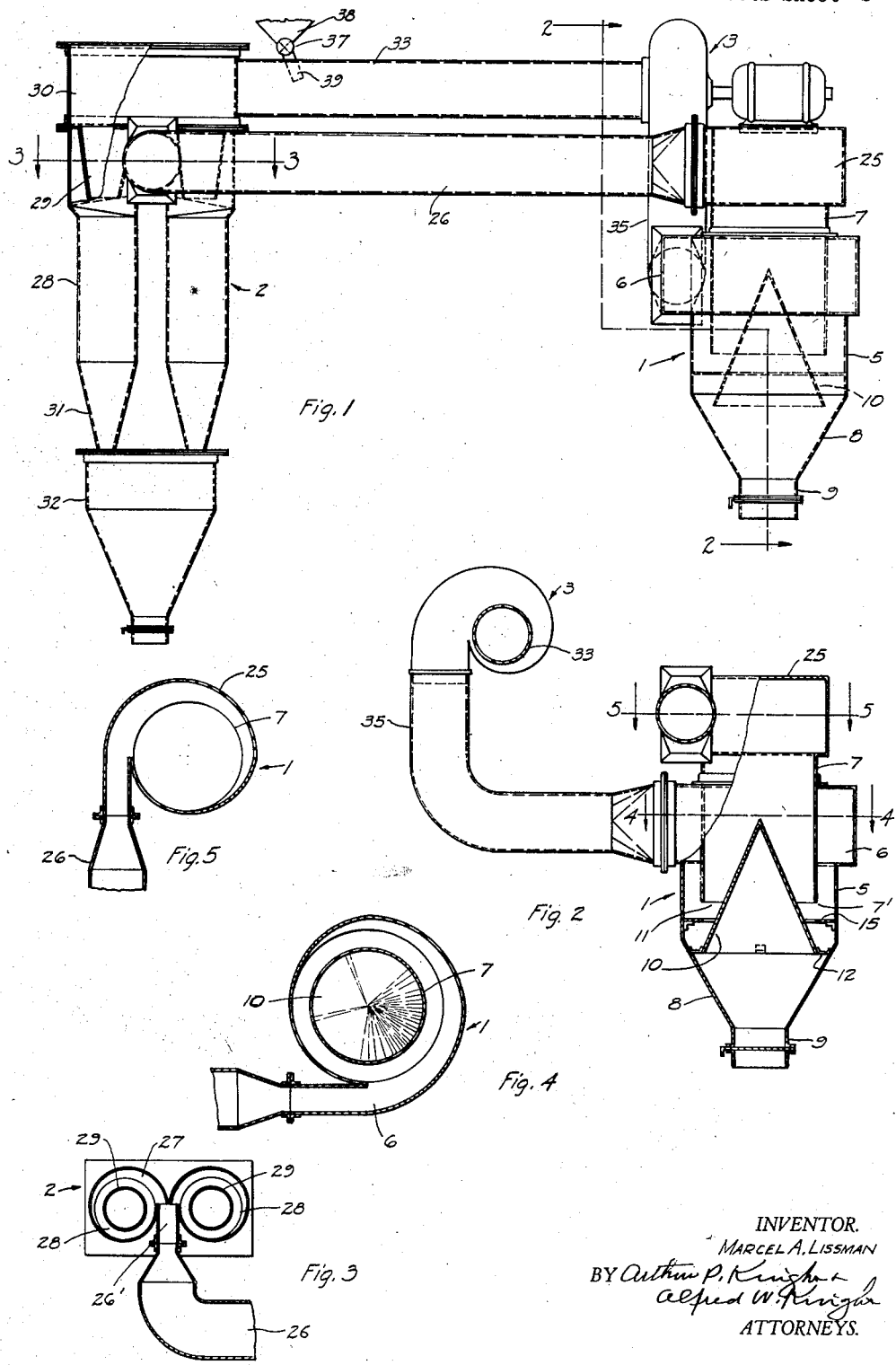
Dec. 19, 1933.  M. A. LISSMAN  1,939,710
CLASSIFYING APPARATUS
Filed Dec. 24, 1931  2 Sheets-Sheet 1
INVENTOR.
MARCEL A. LISSMAN
ATTORNEYS.

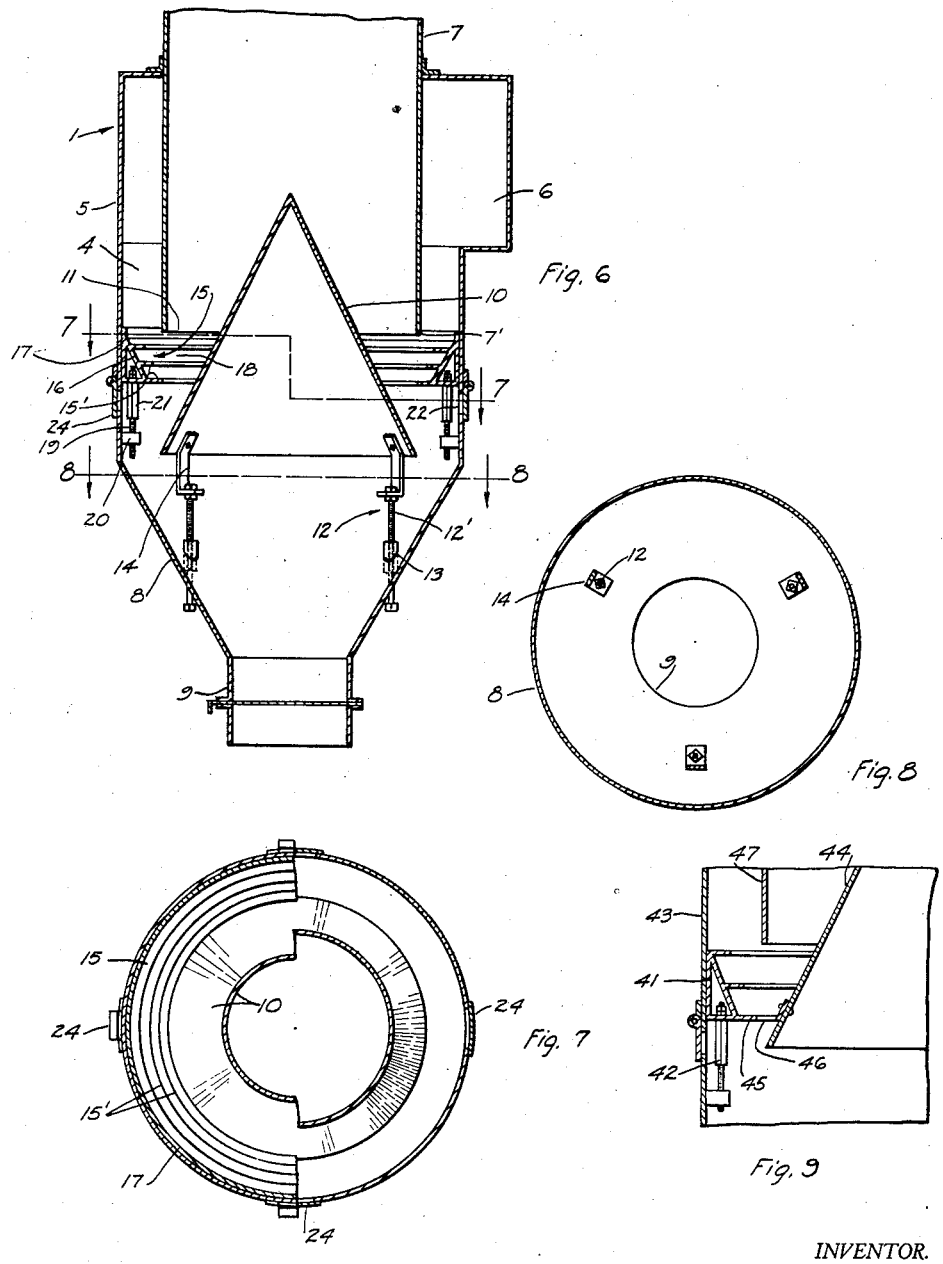
Dec. 19, 1933.  M. A. LISSMAN  1,939,710
CLASSIFYING APPARATUS
Filed Dec. 24, 1931  2 Sheets-Sheet 2
INVENTOR.
MARCEL A. LISSMAN
BY
ATTORNEYS.

1,939,710

UNITED STATES PATENT OFFICE 1,939,710

CLASSIFYING APPARATUS

Marcel A. Lissman, Alhambra, Calif., assignor to International Precipitation Company, Los Angeles, Calif., a corporation of California Application December 24, 1931
Serial No. 582,944

17 Claims. (Cl. 209—144)

This invention relates to improvements in classifying apparatus, and the main object of the invention is to provide improved method and means for separating divided materials of different fineness or density.

An important object of the invention is to provide for sharp separation of divided materials and at the same time obtain a large operating capacity in the separating operation.

A further object of the invention is to provide for accurate control of the classifying operation.

The accompanying drawings illustrate an embodiment of my invention, and referring thereto:

Fig. 1 is a side elevation of the classifying apparatus with parts broken away.

Fig. 2 is a section on line 2—2 in Fig. 1.

Fig. 3 is a section on line 3—3 in Fig. 1.

Fig. 4 is a section on line 4—4 in Fig. 2.

Fig. 5 is a section on line 5—5 in Fig. 2.

Fig. 6 is an enlarged vertical section of the classifying chamber, showing a preferred form of construction.

Fig. 7 is a section on line 7—7 in Fig. 6.

Fig. 8 is a section on line 8—8 in Fig. 6.

Fig. 9 is a partial section of a modified form of the invention.

The apparatus shown in Fig. 1 comprises a classifying chamber 1, separating or dust collecting apparatus 2, connections between said chamber and separating apparatus whereby gas is circulated in closed circuit therebetween, and gas propelling means 3 for effecting such circulation. The classifying chamber shown in detail in Figs. 6 to 8, comprises a vertical cylindrical casing 5 having tangential inlet means 6 for the circulating classifying medium or gas, and a tubular outlet means 7 mounted centrally within said cylindrical casing 5 and extending downwardly into said casing from the upper end thereof to a level below that of the gas inlet means 6, suitable means being provided for deflecting the gas so that it passes upwardly through the gas outlet means 7. The annular passage 4 between the coaxial cylindrical members 5 and 7 is of small radial depth compared to the radius of member 5. The tangential inlet means 6 may consist either of an involute or spiral shaped casing, as shown, or may consist of helically inclined radial vanes, or any other suitable means for delivering gas to the upper end of annular space 4 with a high tangential component of velocity.

A collecting hopper or funnel 8 is provided at the lower end of the casing 5 and has a discharge gate or outlet means 9 at its lower end for separated coarse material. A deflector cone 10 is mounted coaxially within the casing 5, said cone extending vertically with its upper end or apex portion projecting vertically into the lower portion of the tubular gas outlet means 7 and its base portion extending below the lower end of said tubular gas outlet means, leaving an annular throat or passage 11 between the lower edge of the member 7 and the inclined face of said cone, and also providing a restricted annular passage between the lower edge of the cone and the outer casing. Said cone is supported by suitable means 12 which may be mounted on the funnel portion 8 aforesaid, said means being preferably adjustable so as to adjust the height of the cone and thereby adjust the distance between said cone and the lower edge 7' of member 7. For this purpose said means 12 may consist of screws 12' threadedly engaging nut portions 13 on the member 8 and rotatably engaging with brackets 14 on member 10, said screws projecting outside of the member 8 so that the height of the member 10 can be conveniently adjusted. If desired, however, supporting means 12 may consist simply of fixed supporting brackets, as shown in the simplified construction illustrated in Fig. 2.

An annular deflector, flange, or ledge means 15 is provided within the casing 5 somewhat below the lower edge 7' of member 7 and somewhat above the base of the cone 10 so as to provide an annular chamber below said deflector means and between cone 10 and casing 5, for receiving separated coarse material. Said deflector may consist of a simple flat ring as shown in Fig. 2, but is preferably formed, as shown in Fig. 6, as an annular member having a plurality of horizontal flanges 15' disposed one above another and decreasing in internal diameter in descending order, said flanges extending inwardly from a frusto-conical ring 16 which is connected to and supported by a cylindrical sleeve 17 fitting within the casing 5 and slidably mounted thereon to enable its vertical position to be adjusted. Such adjustment may be effected by screw means 19 rotatably engaging in a base flange on the sleeve 16 and having screw engagement with nut portions 20 on casing 5, said screws being shown as provided with wrench holds 21 which are accessible through openings 22 in the casing 5, said openings being normally closed by doors 24.

The tubular outlet member 7 opens at its upper end into an outlet chamber 25 which discharges the gas tangentially into a pipe 26 leading to the dust collector 2. As shown in Fig. 3, said pipe 26 may terminate in a contracted outlet 26' which discharges the gas at high velocity into inlet means 27 opening tangentially into a plurality of tubular centrifugal separator units 28. Each separator unit may consist of a cylindrical vertical tube provided with a tubular outlet member 29 at its upper end, said tubular outlet member communicating at its lower end with the interior of the cylindrical separator member 28 at a point below the inlet means 27, and communicating at its upper end with an outlet header 30. Each separator unit 28 is also provided with a tapering or funnel portion 31 at its lower end, which opens downwardly into a collecting bin or hopper 32.

The outlet header 30 for the dust collector is connected by pipe 33 to the gas propelling means 3 which may consist of a centrifugal blower whose outlet is connected by pipe 35 to the tangential inlet means 6 for the chamber 5 of the classifier. Suitable means are provided for feeding the material to be classified to any suitable part of the apparatus, for example, to the pipe 33 leading from the dust collector or separator 2 to the blower 3. Said means may consist of a feeding device indicated at 37 operated automatically in any suitable manner and serving to feed the material from a bin 38 to a chute 39 which discharges into the pipe 33.

The operation of the apparatus is as follows: The more or less finely divided material which may be the product of a grinding mill and may consist of more or less finely ground cement clinker, rock, or other material, is fed by the feed means described, into the pipe 33 and is drawn forward by the entraining action of the gas stream passing through said pipe. The blower 3 is operated at sufficient speed to draw gas from the pipe 33 and force such gas tangentially through the inlet means 6 into the upper part of the cylindrical chamber 5 around the tubular outlet member 7, the velocity of the gas being sufficient to carry with it all of the divided solid material fed into the gas by the means 33. The gas passing into the cylindrical chamber 5 is given a vortical motion by reason of the tangential arrangement of the inlet means 6, and a centrifugal effect is thereby produced on the suspended material in the gas, causing it to be forced toward the cylindrical wall of the chamber 5 and at the same time to descend within said chamber until it reaches the intercepting deflector or ledge means 15. Said deflector or ledge means deflects the gas inwardly, and the gas passes between the lower edge 7' of tubular outlet means 7 and the said deflector, and then passes upwardly in the annular passage 11 between the said lower edge 7' and the inclined face of cone 10. In this movement the solid suspended material carried by the gas is restrained from being carried forward by the gas; first, by the centrifugal action due to the vortical or whirling motion of said material; second, by the inertia of the solid suspended material which resists the upward acceleration which is imparted to the gas stream as it passes in a curved path under the edge 7' and up through the passage 11; and third, by the action of gravity which tends to cause the heavier or coarser particles to descend from the ledge means 15 into the above-mentioned receiving chamber below said ledge means and to fall eventually into the funnel 8.

The space extending between the parts 7', 15 and 10, and indicated at 18, thus constitutes a classifying or separating zone, in which the gas is given an inward component of velocity, in opposition to the centrifugal action and is then given an upward component of velocity, in opposition to the action of gravity and to the momentum of the particles. By the cooperation of the several factors referred to, the separating action on the coarser and heavier particles may be made sufficient to give a sharp separation between such particles and the lighter particles or "fines", which are carried forward by the gas stream and pass upwardly into the tubular outlet means 7. I have found that the sharpness of separation is also advantageously influenced by the provision of a plurality of ledge means as indicated at 15', which are located at different heights and at progressively closer spacing to the cone 10 from the upper to the lower ledge means. It will also be noted that the zone of separation 18, which is the passage through which the gas passes underneath the edge 7' between the deflector means 15 and the deflector cone 10 upwardly into the tubular outlet 7, is adjacent the outer wall of chamber 5 and the circumferential length of this passage along the edge 7' may be made of a length commensurate with the circumference of the chamber 5 so that a correspondingly large operating capacity may be obtained.

The fines, passing up through the tubular outlet means 10, are discharged through the pipe 26 to the inlet means of the separator 2, and by the operation of the separating units 28 such fines are more or less completely separated from the gas and are collected in hopper 32, the clean gas passing up through the outlet means 29 and back through the pipe 33 to inlet of blower 3, thus completing the circulation. By the above-described means, the coarser particles of the material being operated upon, are mainly or wholly delivered at the outlet of funnel 8, and the fines of the smaller and lighter particles are mainly or wholly delivered at the outlet of hopper 32. The conditions for optimum separation, either as regards sharpness of separation, or as regards proportion of fine or coarse material into which the material being treated is classified, may be regulated by adjustment of the deflector means 15 and deflector cone 10 as above described.

The air carrying in suspension the material to be classified enters the classifier with a high tangential velocity. By keeping the annular space between the external cylindrical casing 5, and the outlet means 7 of small radial depth, the rate of shear in the gas stream at the outside wall is kept very high. As a result, there is a zone immediately adjacent the wall of outlet means 7, in which energy is dissipated at a high rate, thus creating a zone of strong eddies. These eddies agitate the material which tends to collect against wall 5, so that the fines adhering to the coarser particles are forcibly freed by attrition and carried towards the main gas stream by the eddies. The classifying zone is so proportioned and the component of velocity radially inwards is kept sufficiently high to carry along the particles which are of smaller diameter than those desired in the coarse cut. By keeping the tangential component of velocity in the separating zone high, the particles are subjected to a high radial acceleration, many times that of gravity. This permits the inward component of velocity at the zone of separation 18 to be increased many times over that possible with low velocity classifiers. This results in a unit which is very compact for the tonnage which can be handled, as the weight of material which can be kept in suspension in a gas stream increases rapidly with increasing velocity, and while the energy required to keep a unit volume of gas in circulation at the higher velocity is increased, the weight of material classified per unit volume also increases.

The dispersion of the material to be classified is still further improved by the horizontal flanges 15 or 15', which force the material away from the external wall towards the more active zones of gas circulation, enhancing the chance of the fines being trapped and carried along by the main gas stream.

While the design is such as to create strong eddies in the dispersion zone adjacent the outer walls, sufficient tangential component of velocity remains to obtain smooth stream lines of flow in the classification zone, without major eddies. The inertia of the larger particles makes them move downward away from edge 7' of the outlet, due to the downward component of velocity in the annular space between 5 and 7. The separation or classification zone 18 is so proportioned that the larger particles which it is desired to separate cannot reach the outlet 7, but are thrown again into the inlet stream due to the high radial acceleration maintained in the classification zone. These proportions can be altered to suit different materials and to classify at different degrees of fineness by moving cone 10 up and down, also by moving deflector means 16.

In particular, the cone is made sufficiently large to make sure that an oversized particle will be forcibly ejected out of the inner vortex moving towards the gas outlet, before edge 7' is reached, and all such oversize particles eventually spill over the flange means 15 and pass to the coarse material outlet 9.

By reason of the fact that the classifying zone 18 adjacent the lower end of the tubular member 7 extends approximately the full circumference of the apparatus, a comparatively large total cross-section of such zone with accompanyingly large operating capacity is secured, while at the same time the narrow transverse dimension of such zone between said lower edge and the deflector means 15 and 10 provides the high velocity and sharp curvature of motion which produces the close classifying effect desired.

In the treatment of materials which have been ground in mills, it has been found that a difficulty arises in the separation of the fines from the coarse materials by reason of the adhesion of some of the fines to the coarser or larger particles, such adhesion preventing effective separation of such fines from the coarse particles by ordinary methods of separation. The operation of the centrifugal blower 3, such operation consisting in the action on the gas of an impeller rotated at high velocity and comprising blades which exercise a beating action on the gas and on the particles carried thereby, operates to some extent to loosen the adhering fines from the coarse particles. Such loosening of the fines from the coarse particles is thereafter completed by the action of the eddies within the space between the casing 5 and the tubular means 7 as above described.

In some cases it is desirable to adjust the deflecting flange means and the deflecting cone means simultaneously or together, and in such cases the construction shown in Fig. 9 may be used, the deflecting flange means 41 being vertically adjustable by bolt and nut means 42 as above described within the outer casing 43, and the cone member 44 being rigidly connected to the member 41, for example by a bottom flange 45 on said member 41, which extends over to the member 44 and is secured thereto and is provided with openings 46 through which the coarse material may descend to the space below the cone member 44. With this construction the two members 41 and 44 may be adjusted together so that the radial distances between said members and the tubular outlet member 47 are adjusted simultaneously.

I have shown the casing of the classifying apparatus proper as arranged with its cylindrical axis vertical, this being generally the most convenient arrangement. However, my invention is not limited to such an arrangement as said casing and the respective tubular and conical members contained therein may extend horizontally or at any desired inclination, suitable modifications being made if necessary in the feeding and discharging means for the divided material. In any case, the body of gas moves within said casing with tangential components of motion and with a component of motion which is longitudinal with respect to the axis of the cylindrical casing, so as to cause separation of the coarse divided material by reason of the centrifugal forces due to the tangential movement and to cause movement of the separated coarse divided material toward the outlet means therefor by reason of the longitudinal component of motion.

While the centrifugal classifying apparatus 1 is illustrated as connected in closed circuit with a centrifugal separating apparatus 2, it will be apparent that any other form of separating apparatus may be used for removing the fines from the gas discharged from the classifier 1. Furthermore, the classifier is not restricted to use in a closed circuit system with a separator, as shown. For example, the outlet header 30 of the separator may discharge to the atmosphere or to some other apparatus, and the inlet of the classifier may be connected to any other source of gas carrying material to be classified. The classifier and separator may also, if desired, be connected in closed circuit with a grinding mill or the like through which the recirculated gas is passed, for the purpose of separating the coarse material in the classifier and returning the same to the grinding mill, and separately collecting the fines in the separating apparatus. When used in this manner, the grinding mill may be connected in the closed circuit between the outlet from the separator 2 and the inlet of the classifier 1, and the grinding mill in that case constitutes the means for supplying divided material to the circulating gas stream.

I claim:

1. A classifier comprising a cylindrical casing, a cylindrical gas outlet member extending coaxially within said casing, and spaced therefrom to form an annular passage of small radial depth compared to the diameter of the casing, inlet means opening tangentially into the upper end of said annular passage, means for supplying gas containing suspended material to be classified to said inlet means, deflector flange means extending inwardly from the cylindrical casing below the lower edge of said outlet member, and a cone member located within the casing with its apex end extending upwardly into the lower part of the cylindrical outlet member, said cone member being spaced from the deflector flange means to form an outlet for coarse material, and the lower edge of the cylindrical outlet member being spaced from the deflector flange means and from said cone member to form a classifying zone of small transverse dimension compared to the diameter of the cylindrical outlet member, so as to maintain high velocity and rapid reversal of motion of the gas within said classifying zone and thereby carry the fines along with the gas through said outlet member while permitting the coarser particles to pass through the aforesaid outlet therefor, and separator means for separating the fines from the gas passing through the gas outlet member.

2. A construction as set forth in claim 1, in which the inwardly extending deflector flange means comprise a plurality of horizontal flanges, one above another and decreasing in internal diameter in descending order.

3. A construction as set forth in claim 1, and comprising, in addition, means for adjusting the vertical position of the deflector flange means.

4. A construction as set forth in claim 1 and comprising, in addition, means for adjusting the vertical position of the cone member.

5. A construction as set forth in claim 1 and comprising, in addition, means for independently adjusting the vertical positions of the deflector flange means and of the cone member.

6. In a classifier, a cylindrical casing, a tubular means mounted coaxially within said casing and spaced therefrom, said casing and tubular means serving to form an annular passage between said tubular means and said casing and a central passage within said tubular means, means for causing a stream of gas carrying material to be classified to move vertically in said annular passage with tangential and longitudinal components of motion, and to cause such gas to move in reverse longitudinal direction within said central passage, deflector flange means extending inwardly from the casing adjacent the outlet end of said annular passage, means adjacent and beyond said deflector flange means for recovering coarse material passing said flange means, and means for deflecting the gas carrying fines into said central passage.

7. A construction as set forth in claim 6, wherein said last named deflector means is formed as a cone mounted coaxially within the casing.

8. A construction as set forth in claim 6 and comprising in addition, means for simultaneously adjusting the vertical positions of the deflector flange means and of the cone member.

9. In a classifier, a cylindrical casing, a tubular means mounted coaxially within said casing and spaced therefrom to define an annular passage between said tubular means and said casing, means for causing gas carrying material to be classified to move downwardly with a whirling motion through said annular passage, deflector flange means extending inwardly from said casing adjacent and somewhat below the lower end of said tubular means, said casing extending below said deflector flange means to provide a chamber for receiving separated coarse material passing downwardly beyond said flange means, and means disposed centrally within said casing inwardly of said deflector flange and adjacent the lower end of said tubular means for deflecting gas upwardly through said tubular means.

10. A construction as set forth in claim 9, said deflector flange means comprising a plurality of vertically spaced inwardly extending flanges of decreasing internal diameter in descending order.

11. A construction as set forth in claim 9, and comprising in addition, means for vertically adjusting said deflector flange means and said centrally disposed gas deflecting means.

12. In a classifier, a cylindrical casing, a tubular member mounted coaxially within said casing and spaced therefrom to define an annular passage between said tubular means and said casing, means for causing gas carrying material to be classified to move downwardly with a whirling motion through said annular passage, a deflector cone mounted coaxially within said casing and having its upper apex portion extending upwardly within said tubular member and its base portion extending below the lower end of said tubular member, deflector flange means extending inwardly from said casing toward said deflector cone and below said tubular member so as to define a restricted passage between said flange means and said cone, said casing being provided with a chamber below said restricted passage for receiving separated material passing therethrough.

13. A construction as set forth in claim 12, said deflector flange means comprising a plurality of vertically spaced inwardly extending flanges of decreasing internal diameter in descending order.

14. A construction as set forth in claim 12, and comprising in addition, means for relative vertical adjustment of said deflector flange means and deflector cone with respect to one another so as to vary the size of said restricted passage therebetween.

15. A construction as set forth in claim 12 and comprising in addition, means for vertically adjusting said deflector cone relative to said tubular member, so as to vary the spacing between said cone and the lower edge of said tubular member.

16. A construction as set forth in claim 12 and comprising in addition, means for vertically adjusting said deflector flange means relative to the lower end of said tubular member.

17. A construction as set forth in claim 12, the lower edge of said deflector cone extending below said deflector flange means and cooperating with said casing to define another restricted passage therebetween, below said first-named restricted passage.

MARCEL A. LISSMAN.

CERTIFICATE OF CORRECTION.

Patent No. 1,939,710. December 19, 1933.

MARCEL A. LISSMAN.

It is hereby certified that error appears in the printed specification of the above numbered patent requiring correction as follows: Page 4, line 35, claim 6, for "vertically" read vortically; and that the said Letters Patent should be read with this correction therein that the same may conform to the record of the case in the Patent Office.

Signed and sealed this 23rd day of January, A. D. 1934.

F. M. Hopkins (Seal)

Acting Commissioner of Patents.